Patented Sept. 10, 1935

2,013,977

UNITED STATES PATENT OFFICE 2,013,977

PRODUCTION OF POTASSIUM BICARBONATE

Hans Weiss, Mannheim, Germany, assignor to I. G. Farbenindustrie Aktiengesellschaft, Frankfort-on-the-Main, Germany No Drawing. Application February 26, 1932,
Serial No. 595,423. In Germany March 4, 1931

5 Claims. (Cl. 23—64)

The present invention relates to the production of potassium bicarbonate.

A process for the manufacture and production of alkali metal carbonates is known according to which alkali metal chlorides are caused to react in liquid ammonia with carbon dioxide or compounds of ammonia and carbon dioxide and the amounts of water necessary for the reaction at temperatures at which the corresponding alkali metal carbamates are no longer stable under the working conditions.

I have found a new and valuable process by which potassium bicarbonate is obtained by acting on potassium chloride in mixtures of ammonia and water, containing at least sufficient water for the hydrolysis of the carbamate, assuming that this compound may be formed intermediately, to bicarbonate, with carbon dioxide or compounds of carbon dioxide and ammonia at temperatures at which potassium carbamate would be decomposed under the conditions of working. The amount of water which should at least be present, is determined from the following equation:

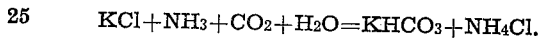

It is preferable, however, to employ larger amounts of water, because by a similar reaction involving lesser amounts of water potassium carbonate can be formed according to the equation:

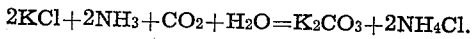

The latter reaction takes place especially when working at comparatively high temperatures. The temperature used and the amount of water must therefore be adapted to each other. The temperature and also the pressure may be varied within wide limits; they should as a rule range between zero and 80° C. and between 5 and 40 atmospheres respectively. The use of elevated pressure is necessary, because in any case the ammonia content of the solution should be greater than corresponds to the solvent power of water for ammonia at room temperature and atmospheric pressure, i. e. the solution should always contain more than 35 per cent of ammonia and accordingly the reaction must be carried out under a pressure of ammonia gas. It is, however, an advantage of the process according to the present invention that only comparatively low pressures are required, so that no difficulties are experienced with regard to the apparatus.

Instead of carbon dioxide, use may be made in the process according to the present invention of compounds of carbon dioxide with ammonia, such as ammonium carbamate or ammonium carbonate or bicarbonate.

The potassium bicarbonate obtained may be readily converted by heating into potassium carbonate; in many cases, as for example when treating with mineral acids to obtain fertilizers, the potassium bicarbonate may be worked up directly.

The following examples will further illustrate the nature of this invention but the invention is not restricted to these examples.

Example 1

800 liters of liquid ammonia, 200 liters of water and 100 kilograms of finely powdered potassium chloride are introduced into a pressure-tight vessel. 45 kilograms of gaseous carbon dioxide are then introduced at 10 atmospheres pressure at room temperature while stirring. After an hour, the mother liquor is withdrawn and the residue washed out with a mixture of liquid ammonia and water (8:2). After drying, the residue consists of about 125 kilograms of an approximately 80 per cent potassium bicarbonate, the remaining 20 per cent consisting of unaltered potassium chloride. About 55 kilograms of ammonium chloride may be recovered from the mother liquor by evaporation.

Example 2

100 kilograms of finely powdered potassium chloride and 110 kilograms of ammonium bicarbonate are introduced into a pressure-tight vessel and then 1000 liters of a liquor consisting of 900 liters of ammonia and 100 liters of water are led through the reaction vessel at a pressure of 25 atmospheres during the course of an hour at 60° C. while stirring. After releasing the pressure and drying, the residue consists of about 130 kilograms of practically pure potassium bicarbonate, while about 70 kilograms of ammonium chloride may be recovered from the mother liquor.

What I claim is:—

1. The process of producing potassium bicarbonate which comprises acting on potassium chloride in mixtures of ammonia and water, containing at least one molecular proportion of water for each molecular proportion of potassium chloride, but more ammonia than can be dissolved in the water present at room temperature and atmospheric pressure, with carbon dioxide at a temperature at which potassium carbamate would be decomposed under the conditions of working.

2. The process of producing potassium bicarbonate which comprises acting on potassium chloride in mixtures of ammonia and water, containing at least one molecular proportion of water for each molecular proportion of potassium chloride, but more ammonia than can be dissolved in the water present at room temperature and atmospheric pressure, with carbon dioxide at a temperature between zero and 80° C.

3. The process of producing potassium bicarbonate which comprises acting on potassium chloride in mixtures of ammonia and water, containing at least one molecular proportion of water for each molecular proportion of potassium chloride, but more ammonia than can be dissolved in the water present at room temperature and atmospheric pressure, with carbon dioxide at a temperature between zero and 80° C. and under a pressure of at least 5 atmospheres.

4. The process of producing potassium bicarbonate which comprises acting on potassium chloride in mixtures of ammonia and water, containing at least one molecular proportion of water for each molecular proportion of potassium chloride, but more ammonia than can be dissolved in the water present at room temperature and atmospheric pressure, with carbon dioxide at room temperature and under a pressure of 10 atmospheres.

5. The process of producing potassium bicarbonate which comprises acting on potassium chloride in mixtures of ammonia and water, containing at least one molecular proportion of water for each molecular proportion of potassium chloride, but more ammonia than can be dissolved in the water present at room temperature and atmospheric pressure, with carbon dioxide at a temperature of 60° C. and under a pressure of 25 atmospheres.

HANS WEISS.